United States Patent
Boora et al.

(10) Patent No.: US 7,746,846 B2
(45) Date of Patent: Jun. 29, 2010

(54) METHOD AND SYSTEM FOR A GIGABIT ETHERNET IP TELEPHONE CHIP WITH INTEGRATED SECURITY MODULE

(75) Inventors: Balwinder Boora, Surrey (CA); Henry Li, Vancouver (CA); Paul Shore, Whistler (CA); Stephen Mueller, Foothill Ranch, CA (US)

(73) Assignee: Broadcom Corporation

( * ) Notice: Subject to any disclaimer, the term of this patent is extended or adjusted under 35 U.S.C. 154(b) by 1386 days.

(21) Appl. No.: 11/151,614

(22) Filed: Jun. 13, 2005

(65) Prior Publication Data

US 2006/0013199 A1 Jan. 19, 2006

Related U.S. Application Data

(60) Provisional application No. 60/588,783, filed on Jul. 15, 2004.

(51) Int. Cl.
*H04L 12/66* (2006.01)
*H04L 29/06* (2006.01)

(52) U.S. Cl. .................................. 370/352; 713/153
(58) Field of Classification Search .............. None
See application file for complete search history.

(56) References Cited

U.S. PATENT DOCUMENTS

| 6,839,841 | B1 * | 1/2005 | Medvinsky et al. | 713/175 |
|---|---|---|---|---|
| 6,889,321 | B1 * | 5/2005 | Kung et al. | 713/153 |
| 7,075,919 | B1 * | 7/2006 | Wendt et al. | 370/352 |
| 7,225,334 | B2 * | 5/2007 | Bianchi | 713/164 |
| 7,325,133 | B2 * | 1/2008 | Fascenda | 713/168 |
| 7,353,388 | B1 * | 4/2008 | Gilman et al. | 713/168 |
| 7,424,024 | B2 * | 9/2008 | Chen et al. | 370/401 |
| 2003/0163693 | A1 * | 8/2003 | Medvinsky | 713/169 |
| 2003/0236901 | A1 * | 12/2003 | Barazesh et al. | 709/230 |
| 2004/0091089 | A1 * | 5/2004 | Wynn | 379/93.05 |
| 2005/0073964 | A1 * | 4/2005 | Schmidt et al. | 370/260 |
| 2005/0076198 | A1 * | 4/2005 | Skomra et al. | 713/156 |
| 2005/0083912 | A1 * | 4/2005 | Afshar et al. | 370/352 |
| 2005/0138582 | A1 * | 6/2005 | So et al. | 716/4 |
| 2005/0144200 | A1 * | 6/2005 | Hesselink et al. | 707/204 |
| 2006/0129848 | A1 * | 6/2006 | Paksoy et al. | 713/193 |

\* cited by examiner

*Primary Examiner*—Hong Cho
*Assistant Examiner*—Eunsook Choi
(74) *Attorney, Agent, or Firm*—McAndrews, Held & Malloy, Ltd.

(57) ABSTRACT

Methods and systems for processing Ethernet data are disclosed and may comprise receiving Ethernet data via a single gigabit Ethernet IP telephone chip. A secure application key may be received from a secure server by an OSM integrated within the gigabit Ethernet IP telephone chip for processing the received Ethernet data. The received Ethernet data may be processed by the gigabit Ethernet IP telephone chip based on the received secure application key. A unique security identifier internal to the single gigabit Ethernet IP telephone chip may be communicated off-chip to the secure server. The unique security identifier may identify the single gigabit Ethernet IP telephone chip. The secure server may authenticate the gigabit Ethernet IP telephone chip based on the unique security identifier internal to the single gigabit Ethernet IP telephone chip, prior to the receiving of the secure application key.

22 Claims, 12 Drawing Sheets

METHOD AND SYSTEM FOR A GIGABIT ETHERNET IP TELEPHONE CHIP WITH INTEGRATED SECURITY MODULE

CROSS-REFERENCE TO RELATED APPLICATIONS/INCORPORATION BY REFERENCE

This application makes reference to, claims priority to, and claims the benefit of U.S. Provisional Application Ser. No. 60/588,783 filed on Jul. 15, 2004.

This application makes reference to:
U.S. application Ser. No. 11/151,138 filed Jun. 13, 2005;
U.S. application Ser. No. 11/151,388 filed Jun. 13, 2005;
U.S. application Ser. No. 11/151,135 filed Jun. 13, 2005; and
U.S. application Ser. No. 11/151,139 filed Jun. 13, 2005.

All of the above stated applications are hereby incorporated herein by reference in their entirety.

FIELD OF THE INVENTION

Certain embodiments of the invention relate generally to IP telephones. More specifically, certain embodiments of the invention relate to a method and system for a gigabit Ethernet IP telephone chip with integrated OSM.

BACKGROUND OF THE INVENTION

High-speed digital communication networks over copper and optical fiber are used in many network communication and digital storage applications. Ethernet and Fiber Channel are two widely used communication protocols, which continue to evolve in response to increasing demands for higher bandwidth in digital communication systems.

The Ethernet protocol may provide collision detection and carrier sensing in the physical layer. The physical layer, layer 1, is responsible for handling all electrical, optical, opto-electrical and mechanical requirements for interfacing to the communication media. Notably, the physical layer may facilitate the transfer of electrical signals representing an information bitstream. The physical layer (PHY) may also provide services such as, encoding, decoding, synchronization, clock data recovery, and transmission and reception of bit streams.

As the demand for higher data rates and bandwidth continues to increase, equipment vendors are continuously being forced to employ new design techniques for manufacturing network equipment capable of handling these increased data rates. In response to this demand, the physical layer, or PHY, has been designed to operate at gigabit speeds to keep pace with this demand for higher data rates. These gigabit PHYs are now becoming quite popular in home and office use.

Gigabit Ethernet, which initially found application in gigabit servers, is becoming widespread in personal computers, laptops, and switches, thereby providing the necessary infrastructure for handling data traffic of PCs and packetized telephones. However, network switches, which may be located in a central location within an office, run multiple cable mediums for network and voice data from the switch location to individual office locations, for example. In this regard, multiple cable mediums are now utilized to carry voice and network data. In the alternative, a single cable medium for voice and network data may run from the network switch to individual office locations. However, this scenario is costly as each office location will require a separate switch to route voice data to a telephone and network data to a PC.

Furthermore, existing 10/100 Base Ethernet IP telephones place a bottleneck on the gigabit path between gigabit Ethernet enabled PCs and gigabit Ethernet wiring switches, since the Ethernet IP telephone is not adapted to process data utilizing gigabit speeds. Data may be communicated in gigabit speeds from a gigabit Ethernet switch to the Ethernet IP telephone, but the Ethernet IP telephone may only handle data at speeds lower than one gigabit. In this regard, existing telephones may only process gigabit Ethernet data speeds with an external gigabit Ethernet transceiver which increases connection complexity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a gigabit Ethernet IP telephone chip with integrated security module, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a gigabit Ethernet IP telephone chip with an integrated OSM. In accordance with an embodiment of the invention, the OSM integrated within the gigabit Ethernet IP telephone chip may be adapted to provide a hardware-ensured secure solution for digitally identifying a device based on cryptographic algorithms. For example, a device, such as a gigabit Ethernet IP telephone comprising a gigabit Ethernet IP telephone chip with an integrated OSM, may be identified and authenticated to other devices during an exchange of voice and/or network data utilizing one or more unique security identifiers stored in on-chip memory within the integrated OSM. In this regard, secure digital identification may be achieved by embedding the unique security identifiers in protected on-chip one-time programmable (OTP) ROM, for example.

The OSM may also be utilized to encrypt voice and/or data traffic transmitted from the gigabit Ethernet IP telephone and decrypt voice and/or data traffic received for processing by the gigabit Ethernet IP telephone chip with integrated OSM. Furthermore, the integrated OSM may comprise assurance logic, which may be adapted to prevent device tampering and unwanted access to secure information stored within the gigabit Ethernet IP telephone chip. Throughout this document, the integrated on-chip hardware-based OSM may be also referred to as an on-chip OSM.

Figure 1A:
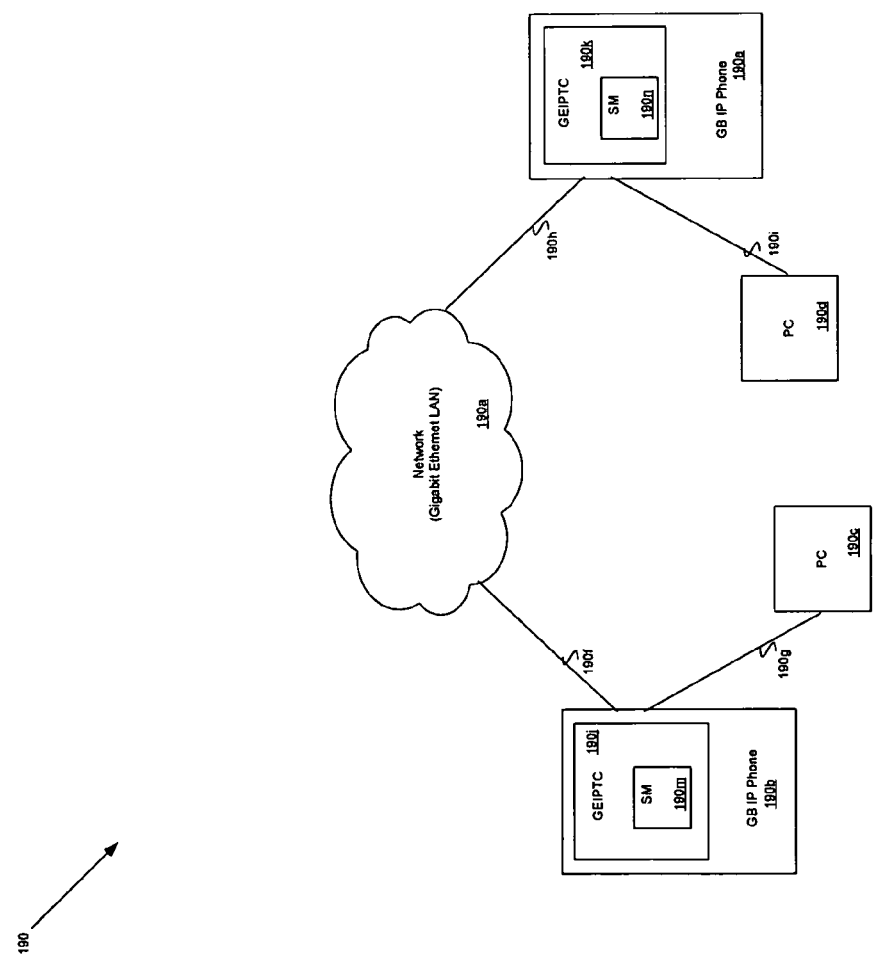
FIG. 1A is an exemplary system comprising gigabit IP telephones coupled to a network, in accordance with an embodiment of the invention.

FIG. 1A is an exemplary system comprising gigabit IP telephones coupled to a network, in accordance with an embodiment of the invention. Referring to FIG. 1A, the network telephone system 190 may comprise gigabit IP telephones 190b and 190e, personal computers (PCs) 190c and 190d, and a network 190a. The PCs 190c and 190d may be gigabit Ethernet enabled PCs. The network may comprise gigabit Ethernet local area network (LAN). The gigabit IP telephones 190b and 190e may each comprise an integrated gigabit Ethernet IP telephone chip (GEIPTC) 190j and 190k, respectively. The GEIPTC 190j and 190k may comprise suitable circuitry, logic, and/or code and may be adapted to support connection between the gigabit IP telephones 190b and 190e, the network 190a, and the PCs 190c and 190d, respectively. Furthermore, the gigabit Ethernet IP telephone chips 190j and 190k may comprise OSMs 190m and 190n for performing data security functions, such as gigabit Ethernet IP telephone authentication, secure key exchange and authentication, and/or voice and data encryption and decryption. A single gigabit Ethernet cable medium 190f may connect the network 190a and the gigabit IP telephone 190b and a single gigabit Ethernet medium cable 190g may connect the gigabit IP telephone 190b with the gigabit enabled PC 190c. Similarly, a single gigabit Ethernet cable medium 190h may connect the network 190a and the gigabit IP telephone 190e and a single gigabit Ethernet medium cable 190i may connect the gigabit IP telephone 190e with the gigabit enabled PC 190d.

In operation, voice data may be communicated between gigabit IP telephones 190e and 190b, via Ethernet cable mediums 190h, 190f, and the network 190a. The network 190a may also communicate network data to the gigabit Ethernet enabled PCs 190c and 190d, via Ethernet cable mediums 190f, 190g, 190h, and 190i. The OSMs 190m and 190n within the GEIPTC 190j and 190k, respectively, may then authenticate the connections between the gigabit Ethernet IP telephones 190b and 190e, and/or the connections between the telephones 190b and 190e and the network 190a. Furthermore, the OSMs 190m and 190n may be adapted to encrypt and/or decrypt voice or network data communicated between the telephones 190b and 190e.

Ethernet cable media 190f and 190h may communicate network data, originating from the network 190a, and voice data, originating from either telephone 190b or telephone 190e. After gigabit IP telephones 190b and 190e receive voice and network data via Ethernet cable mediums 190f and 190h, the GEIPTC 190j and 190k integrated within gigabit IP telephones 190b and 190h may switch the voice data for processing within the telephones 190b and 190h. Furthermore, the GEIPTC 190j and 190k may switch the network data to the PCs 190c and 190d via Ethernet cable mediums 190g and 190i, respectively.

Figure 1B:
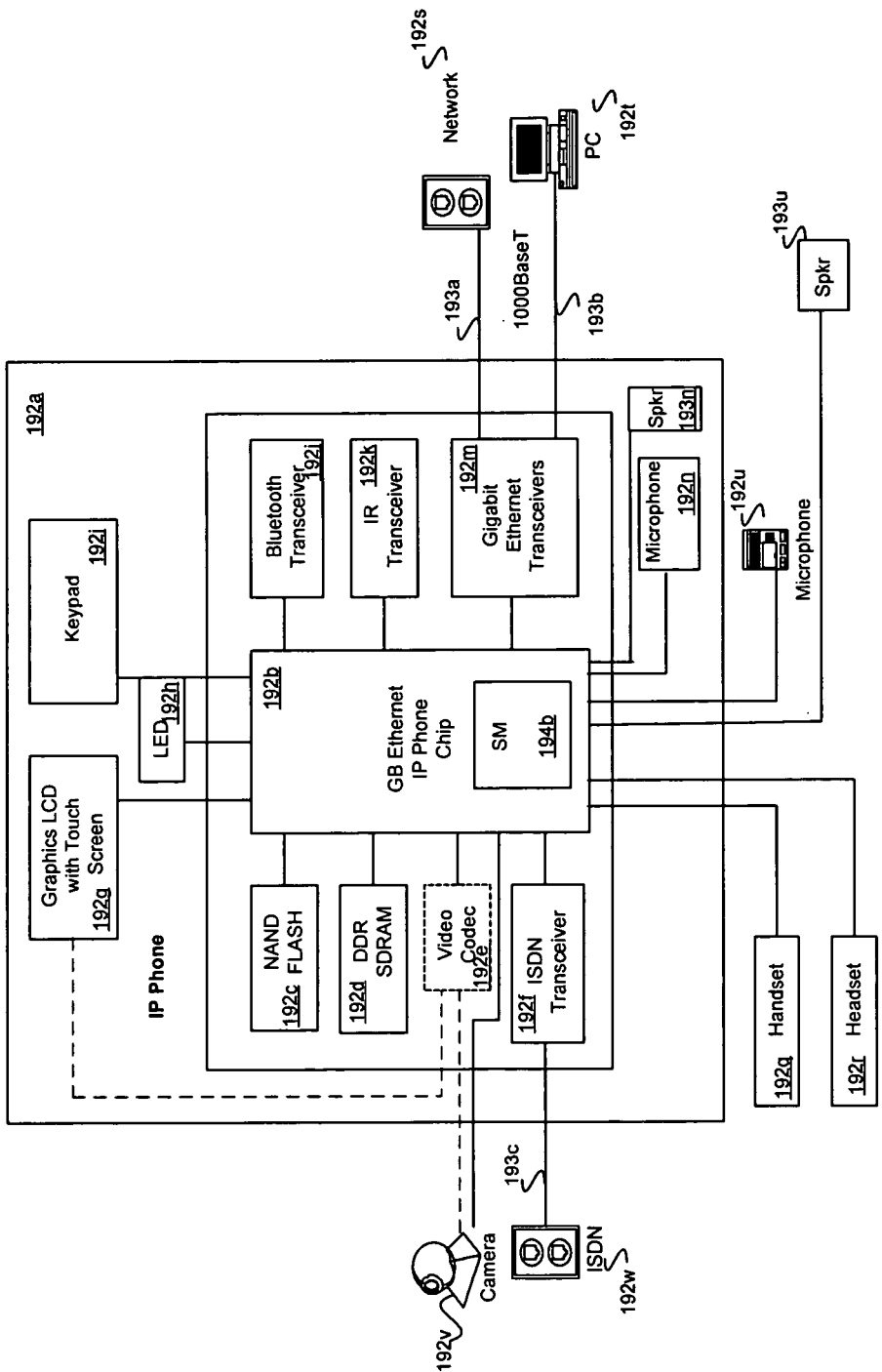
FIG. 1B is a block diagram of an exemplary gigabit Ethernet IP telephone comprising a single integrated gigabit Ethernet IP telephone chip, in accordance with an embodiment of the invention.

FIG. 1B is a block diagram of an exemplary gigabit Ethernet IP telephone comprising a single integrated gigabit Ethernet IP telephone chip, in accordance with an embodiment of the invention. Referring to FIG. 1B, the exemplary gigabit Ethernet IP telephone 192a may comprise a gigabit Ethernet IP telephone chip 192b, a LED 192h, keypad 192i, graphics LCD with touch screen capabilities 192g, NAND Flash memory 192c, double data rate synchronous dynamic random access memory (DDR SDRAM) 192d, an integrated services digital network (ISDN) transceiver 192f, internal microphone 192n, internal speaker 193n, a gigabit Ethernet transceiver (PHY) 192m, an IR transceiver 192k, and a Bluetooth® transceiver 192j. In one embodiment of the invention, the gigabit Ethernet IP telephone 192a may comprise a video codec block 192e, which may be optional. The gigabit Ethernet IP telephone chip 192b may comprise an on-chip security module (OSM) 194b for performing data security functions within the gigabit Ethernet IP telephone 192a, such as device authentication, secure key exchange and authentication, and/or voice and data encryption and decryption functionalities.

In another embodiment of the invention, the gigabit Ethernet IP telephone chip with integrated OSM 192b may be adapted to acquire and process voice data from one or more off-chip devices coupled to the gigabit Ethernet IP telephone 192a. For example, voice data may be communicated to the gigabit Ethernet IP telephone 192a from a network, such as a gigabit Ethernet LAN 192s via the Ethernet cable medium 193a and off-chip gigabit Ethernet transceiver (PHY) 192m, or from an ISDN 192w via cable medium 193c and an ISDN transceiver 192f. Voice data may be also communicated to the gigabit Ethernet IP telephone 192a via handset 192g, headset 192r, external speaker 193u, or internal speaker 193n. The OSM 194b may be adapted to authenticate the off-chip devices that communicate voice data to the gigabit Ethernet IP telephone 192a. Furthermore, the OSM 194b may be utilized to decrypt received voice data and/or to encrypt voice data communicated outside the gigabit Ethernet IP telephone 192a.

In another embodiment of the invention, the gigabit Ethernet IP telephone chip 192b may be adapted to acquire and process network data from one or more off-chip devices coupled to the gigabit Ethernet IP telephone 192a. For example, network data may be received by the gigabit Ethernet IP telephone chip 192b from the network 192s via the Ethernet cable medium 193a and the gigabit PHY 192m. The gigabit Ethernet IP telephone chip 192b may utilize video codec 192e to decode received video data. Furthermore, video data may be communicated to the gigabit Ethernet IP telephone chip 102b for processing from an external camera 192v coupled to the video codec 192e. Processed data, which may comprise voice and/or video data, may be stored by the gigabit Ethernet IP telephone chip 192b in off-chip memory, such as NAND flash memory 192c and/or DDR SDRAM 192d. Video data may be also displayed by the LCD screen 192g. In one embodiment of the invention, the video codec 192e may be utilized for encoding as well as for providing video conferencing capabilities to the gigabit Ethernet IP telephone 192a.

If the gigabit Ethernet IP telephone 192a comprises a video codec 192e, the camera 192v and the LCD 192g may be coupled to the video codec 192e. If the gigabit Ethernet IP telephone 192a does not comprise a video codec 192e, the camera 192v and the LCD 192g may be coupled to the gigabit Ethernet IP telephone chip 192b. The OSM 194b may be adapted to authenticate the off-chip devices that communicate network data to the gigabit Ethernet IP telephone 192a. Furthermore, the OSM 194b may be utilized to decrypt received network data and/or to encrypt network data communicated outside the gigabit Ethernet IP telephone 192a.

The gigabit Ethernet IP telephone chip 192b may comprise suitable circuitry, logic, and/or code and may be adapted to prioritize and switch voice and/or network data for processing within the gigabit Ethernet IP telephone 192a or outside the telephone 192a. For example, voice data may be communicated to the gigabit Ethernet IP telephone chip 192b from the ISDN 192w via the cable medium 193c and the off-chip ISDN transceiver 192f. Network data may be communicated to the gigabit Ethernet IP telephone chip 192b from the network 192s via the Ethernet cable medium 193b and the off-chip gigabit PHY 192m. The gigabit Ethernet IP telephone chip 192b integrated within the gigabit IP telephone 192a may then switch the voice data for processing within the telephone 192a. The network data may be switched to the PC 192t via the off-chip gigabit Ethernet PHY 192m and the Ethernet cable medium 193b. Other data switching scenarios for switching voice and/or network data by the gigabit Ethernet IP telephone chip 192b may also be possible utilizing one or more peripheral device coupled to the gigabit IP telephone 192a, as illustrated in FIG. 1B.

Figure 1C:
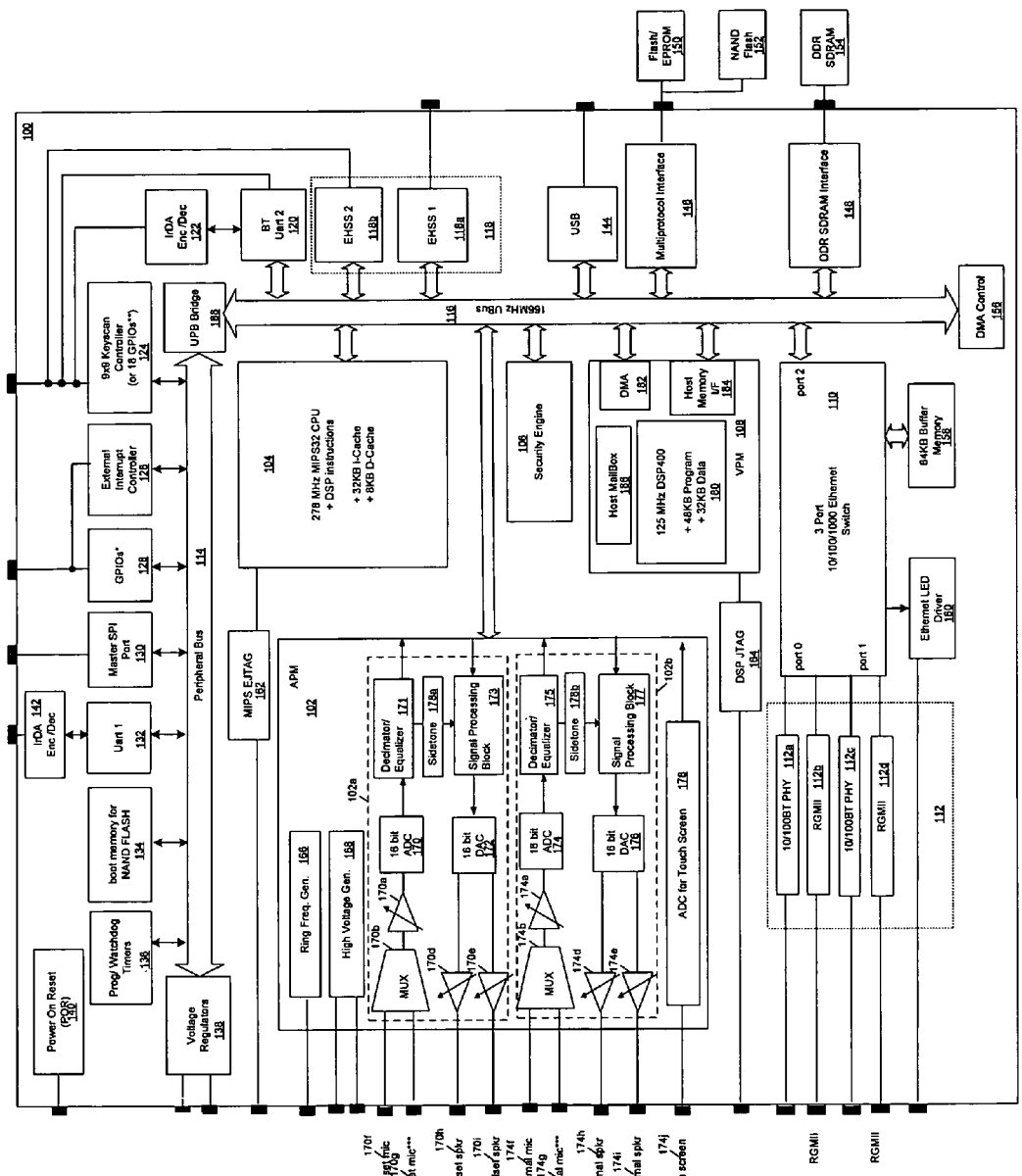
FIG. 1C is a block diagram of an exemplary system for a gigabit Ethernet IP telephone chip having an integrated on-chip security module (OSM), in accordance with an embodiment of the invention.

FIG. 1C is a block diagram of an exemplary system for a gigabit Ethernet IP telephone chip having an integrated OSM, in accordance with an embodiment of the invention. Referring to FIG. 1C, the chip 100 may comprise a dual CODEC block 102, a core processor 104, security engine 106, voice processing module (VPM) 108, a multiport Ethernet switch 110, PHY/RGMII interfaces block 112, peripheral bus 114, system bus 116, power on reset (POR) block 140, voltage regulators block 138, DMA controller block 156, memory block 158, Ethernet LED interface 160, Joint Test Action Group (JTAG) ports 162, 164, a plurality of system interfaces, and a plurality of peripheral interfaces.

The system interfaces may comprise a Bluetooth interface 120, an Infrared Data Association (IrDA) encoder/decoder block 122, an enhanced high-speed serial (EHSS) port block 118, a universal serial bus (USB) interface block 144, multiprotocol interface block 146, and a memory interface 148. Communication with the system interfaces may occur via the system bus 116. The peripheral interfaces may comprise a keyscan controller block 124, an external interrupt controller block 126, a general purpose input/output (GPIO) block 128, a master serial peripheral interface (SPI) port block 130, a universal asynchronous receiver/transmitter (UART) block 132, an Infrared Data Association (IrDA) encoder/decoder block 142, boot memory block for NAND flash 134, and programmable/watchdog timers block 136. Communication with the peripheral interfaces may occur via the peripheral bus 114. The peripheral bus 114 and the system bus 116 may be coupled via a universal bus to peripheral bus bridge (UPB) 188.

The dual CODEC block 102, the core processor 104, the security engine 106, the voice processing module (VPM) 108, the multiport Ethernet switch 110, the DMA controller block 156, the Bluetooth interface 120, the enhanced high-speed serial (EHSS) port block 118, the universal serial bus (USB) interface block 144, the multiprotocol interface block 146, and the DDR SDRAM memory interface 148 may be coupled via the system bus 116. The keyscan controller block 124, the external interrupt controller block 126, the general purpose input/output (GPIO) block 128, the master serial peripheral interface (SPI) port block 130, the universal asynchronous receiver/transmitter (UART) block 132, the Infrared Data Association (IrDA) encoder/decoder block 142, the boot memory block for NAND flash 134, and the programmable/watchdog timers block 136 may be coupled via the peripheral bus 114. Furthermore, the PHY/RGMII interfaces block 112, the memory block 158, and the Ethernet LED interface 160 may be coupled to the multiport Ethernet switch 110.

The dual CODEC block 102 comprises suitable coder/decoder (CODEC) logic, circuitry and/or code that may be adapted to handle compression/decompression of audio signals, such as conversion between analog signals and digital samples at various sample rates. For example, the dual CODEC block 102 may comprise a ring frequency generator block 166, a high voltage generator block 168, CODEC blocks 102a and 102b. The CODEC block 102a may comprise a decimator/equalizer block 171, a sidetone generator block 178a, a signal processing block 173, an interpolating CIC filter 173, an ADC block 170, a digital-to-analog converter (DAC) block 172, a multiplexer 170b, and gain controllers (amplifiers) 170a, 170d and 170e. Similarly, the CODEC block 102b may comprise a decimator/equalizer block 175, a sidetone generator block 178b, a signal processing block 177, an ADC block 174, a digital-to-analog converter (DAC) block 176, a multiplexer 174b, and gain controllers (amplifiers) 174a, 174d and 174e. The decimator/equalizer blocks 171 and 173 may comprise one or more decimating cascaded integrator comb (CIC) filters and/or one or more equalizers. The CIC filters may be adapted to perform resampling from 12.5 MHz, for example, which may be the raw sampling rate of the ADCs 170 and 174 and the DACs 172 and 176.

Also integrated within chip 100 is an ADC 178 that may be adapted to handle touch screen capability. Although the ADC 178 is illustrated as being internal to the dual CODEC block 102, the invention is not so limited. Accordingly, in another embodiment of the invention, the ADC 178 may be located externally to the dual CODEC block 102. The sidetone generator blocks 178a and 178b may comprise one or more Y-filters and may allow sidetone to be added to a receive path of an audio signal.

The CODEC block 102a may be adapted to support a plurality of input and a plurality of output audio sources by way of multiplexing. For example, audio input from a handset microphone 170f and a headset microphone 170g may be multiplexed by the multiplexer 170b and may be utilized as audio inputs to the CODEC block 102a. Audio output signals from the CODEC block 102a may be amplified by amplifiers 170d and 170e before being communicated to a handset speaker 170h and a headset speaker 170i, respectively.

Similarly, the CODEC block 102b may be adapted to support a plurality of input and a plurality of output audio sources by way of multiplexing. For example, audio input from an internal microphone 174f and an external microphone 174g may be multiplexed by the multiplexer 174b and may be utilized as audio inputs to the CODEC block 102b. Audio output signals from the CODEC block 102b may be amplified by amplifiers 174d and 174e before being communicated to an internal speaker 174h and an external speaker 174i, respectively. The ADC 178 may be adapted to convert analog signals received from the touch screen enabled monitor 174j.

The ring frequency generator 166 may comprise suitable circuitry, logic, and/or code and may be adapted to generate a ringing reference waveform. The generated ringing reference waveform may be utilized by one or more serial link and interrupt controllers (SLICs), integrated within the gigabit Ethernet IP telephone chip 100, to drive their high voltage ringing circuitry. The waveform generated by the ring frequency generator 166 may be configurable between sinusoids, trapezoids, and square waves. Frequency, amplitude, and DC offset may also be configurable. In one embodiment of the invention, the ring frequency generator 166 may comprise power down control circuitry.

The high voltage generator 168 may comprise suitable circuitry, logic, and/or code and may be adapted to generate voltages required by an external SLIC, for example, for ringing and battery feed. In one aspect of the invention, the high voltage generator 168 may be adapted to generate a plurality of negative supply voltages, such as −70 and −21 V nominally, which may be required for SLIC operation.

The core processor 104 may be, for example, a reduced instruction set computer (RISC) processor, such as a million-instructions-per-second (MIPS) processor. The core processor 104 may also comprise suitable logic, circuitry and/or code that may be adapted to handle digital signal processing (DSP) instructions. In an embodiment of the invention, the ability to handle DSP instructions by the core processor 104 may be enabled or disabled. Accordingly, the core processor 104 may be operated with the DSP instruction capability disabled. In one aspect of the invention, the ability to handle DSP instructions by the core processor 104 may be disabled when the voice processing module 108 is utilized. A Joint Test Action Group (JTAG) emulator (EJTAG) port 162 may be coupled to the processor core 162 and may be utilized for debugging. The core processor 104 may be a RISC processor that may be utilized to run operating system code and customer application code, for example. Customer application code may include messaging code, call processing code and web browser code, for example.

The security engine 106 may comprise suitable logic, circuitry, and/or code that may be adapted to handle security functions, such as encryption, decryption and/or authentication. The security engine 106 may comprise a hardware based security module (HSM), not shown in FIG. 1C, which may provide a hardware-ensured secure way to digitally identify a device based on cryptographic algorithms. Secure digital identification within the HSM may be achieved by, for example, embedding the identity or private key information in protected on-chip one-time programmable (OTP) ROM. Private key information may then be used to secure voice and/or data traffic within the gigabit Ethernet IP telephone chip 100. The HSM may also comprise assurance logic, which may be utilized to prevent device tampering and unwanted access to secure information in ROM.

The security engine 106 may be also adapted to authenticate the off-chip devices that communicate voice and/or network data to the gigabit Ethernet IP telephone chip 100. In this regard, the security engine 106 may establish a secure connection with a secure key management module (not illustrated in FIG. 1C), for example. The key management module may be adapted to authenticate the gigabit Ethernet IP telephone chip 100 and supply one or more secure program keys to the security engine 106. The security engine 106 may then decrypt or encrypt voice and/or network data utilizing the secure program keys supplied by the key management module.

The voice processing module (VPM) 108 may comprise a digital signal processor (DSP) block 180, a host mailbox block 186, a direct memory access (DMA) block 182, and a host memory interface block 184. The DSP block 180 may comprise memory that may be adapted to handle storage of data and storage of program code. A JTAG port 164 coupled to the VPM 108 may be utilized for debugging. The DSP block 180 may be adapted to run voice processing application code and CODEC algorithms for one or more of a plurality of protocols or standards.

The VPM 108 may be adapted to perform voice related signal processing functions within the gigabit Ethernet IP telephone chip 100. The DMA block 182 may be utilized to transport CODEC data and/or program code between internal memory of the VPM 108 and external memory, such as dynamic random access memory (DRAM) for example, for processing. In one embodiment of the invention, the DMA block 182 may comprise a dual channel DMA engine. Voice data may be also stored in off-chip memory, such as DDR-SDRAM 154 via the DDR-SDRAM interface 148.

The host mailbox block 186 may comprise a set of mailbox registers, which may be utilized to provide communication between the core processor 104 and the DSP block 180. For example, the mailbox registers of the host mailbox block 186 may utilize an interrupt mechanism between the core processor 104 and the DSP block 180, for handling the processing of more data. The host memory interface 184 may be utilized by the DSP block 180 to directly access messages residing in external DRAM, for example.

The PHY/RGMII interfaces block 112 may comprise reduced gigabit media independent interfaces (RGMII) 112b and 112d, and 10/100Base Ethernet physical interface transceivers (PHY) 112a and 112c. The RGMII 112b and 112d may comprise suitable circuitry, logic, and/or code and may be adapted to provide an interface between a gigabit media independent interface (GMII) of the multiport Ethernet switch 110 and an external Ethernet PHY. In one embodiment of the invention, the gigabit Ethernet IP telephone chip may utilize a gigabit PHY for receiving and transmitting of packetized data. The gigabit PHY may be implemented off-chip or may be integrated within the gigabit Ethernet IP telephone chip 100. In this regard, the RGMII 112b and 112d may provide an interface between a gigabit media independent interface (GMII) of the multiport Ethernet switch 110 and an external gigabit PHY.

The 10/100Base PHYs 112a and 112c may comprise suitable circuitry, logic, and/or code and may be adapted to perform physical layer interface functions for 100BASE-TX full-duplex or half-duplex Ethernet on Category 5 cable, and/or 10BASE-T full-duplex or half-duplex Ethernet on Category 3, 4, or 5 cabling within the gigabit Ethernet IP telephone chip 100. For example, the 10/100Base PHYs 112a and 112c may support 4B5B, MLT3, and Manchester encoding and decoding, clock and data recovery, stream cipher scrambling/descrambling. The 10/100Base PHYs 112a and 112c may also support digital adaptive equalization, line transmission, carrier sense and link integrity monitor, auto-negotiation, and management.

The multiport Ethernet switch 110 may comprise suitable circuitry, logic, and/or code and may be adapted to switch between one or more ports that route data internally within the gigabit Ethernet IP telephone chip 100 for processing and one or more other ports that route data for off-chip processing. For example, as illustrated in FIG. 1C, the multiport Ethernet switch 110, which may be a 10/100/1000 Ethernet switch, may comprise a plurality of ports, port 0 and port 1, for receiving and transmitting network and/or voice data off-chip via the PHY/RGMII interfaces block 112. The multiport Ethernet switch 110 may also comprise port 2 for routing voice and/or network data internally for processing within the gigabit Ethernet IP telephone chip 100. Port 0 may be coupled to the 10/100Base PHY 112a and RGMII interface 112b. Port 1 may be coupled to a 10/100Base PHY 112c and RGMII interface 112d. Port 2 may be coupled to the system bus 116.

The multiport Ethernet switch 110 may utilize memory 158 and an Ethernet LED interface 160. The Ethernet LED interface 160 may comprise suitable circuitry, logic, and/or code and may be utilized to provide visibility of link status, combined transmit and receive activity, duplex mode, and/or port speed for each port within the multiport Ethernet switch 110. The Ethernet LED interface 160 may also provide an indication of the load and/or status of the multiport Ethernet switch 110.

The keyscan controller block 124 may comprise suitable logic, circuitry and/or code that may be adapted to determine when a key is pressed and to identify what key or keys are depressed. In one aspect of the invention, the input and output pins of the keyscan controller block 124 may be configured as general purpose input/output (GPIO) pins. The power on reset (POR) block 140 may comprise suitable logic and/or circuitry that may be adapted to handle power up and reset scenarios. The voltage regulators block 138 may comprise suitable logic and/or circuitry that may be adapted to handle voltage/current regulation within the gigabit Ethernet IP telephone chip 100.

The multiprotocol peripheral interface (MPI) block 146 may comprise suitable logic, circuitry and/or code that may be adapted to handle a plurality of different types of memory. As illustrated in FIG. 1C, flash/EPROM block 150 and NAND flash block 152 may be coupled to the multiprotocol interface block 146. The MPI block 146 may also support other types of memory, such as NOR flash memory, as well as PCI, Mini PCI, CardBus, PCMCIA and expansion bus interface (EBI) devices. In this regard, the gigabit Ethernet IP telephone chip 100 may be adapted support high-speed peripherals, including wireless network adaptors and/or video processors, for example.

The memory interface 148 may be, for example, a double data rate (DDR) SDRAM interface block. As illustrated in FIG. 1C, a DDR SDRAM block 154 may be externally coupled to the DDR SDRAM interface block 148. The memory interface 148 may be utilized to speedily move data on-chip and off-chip for processing. The memory interface 148 may be also adapted to support single data rate (SDR) SDRAM, or other types of DRAM. The DMA controller block 156 may be utilized to facilitate DMA transfers between the external SDRAM 154 and external bus interface (EBI) devices coupled to the gigabit Ethernet IP telephone chip 100. The universal serial bus (USB) interface block 144 may comprise a USB compliant serial bus, which may be, for example, USB1.1, USB2.0, or other USB compliant interface.

The external interrupt controller block 126 may comprise suitable logic, circuitry, and/or code and may be adapted to handle external interrupts. For example, one or more external events may cause the external interrupt controller 126 to generate an interrupt to the core processor 104.

The GPIO block 128 may comprise a plurality of general-purpose I/O interface pins that may be programmed as input and/or output pins of the gigabit Ethernet IP telephone chip 100. One or more registers within the gigabit Ethernet IP telephone chip 100 may be utilized to program the general-purpose I/O interface pins in the GPIO block 128. The GPIO block 128 may also comprise a LED matrix block, which may be utilized to indicate a status of the GPIO interface pins.

The master SPI port block 130 is a standardized serial peripheral interface (SPI) port and may be utilized for communication with the serial programming interfaces of various devices coupled to the gigabit Ethernet IP telephone chip 100.

The universal asynchronous receiver/transmitter (UART) block 132 may comprise a standard UART port which may be utilized as a debug port. The UART block 132 may be coupled to an Infrared Data Association (IrDA) encoder/decoder block 142 which may support serial infrared (SIR) mode of infrared communication. In this regard, the IrDA encoder/decoder block 142 may support an infrared communication portal between a PC and PDAs or cellular phones utilizing the gigabit Ethernet IP telephone chip 100.

The boot memory block for NAND flash 134 may be adapted to store boot code that controls initialization and setup of the gigabit Ethernet IP telephone chip 100. Other code or parameters may also be stored in the boot memory block for NAND flash 134.

The programmable/watchdog timers block 136 may comprise a plurality of timers such as a watchdog timer. In this regard, a watchdog timer may be included to generate a chip reset if the gigabit Ethernet IP telephone chip 100 is not periodically reset. An interrupt, for example, may be generated after one-half the watchdog count to remind the host to reset the timer.

The Bluetooth interface 120 is Bluetooth compliant and may be coupled to the IrDA encoder/decoder (ENC/DEC) interface block 122. The Bluetooth interface 120 may comprise an UART which may be adapted to support external Bluetooth modules. The Infrared Data Association (IrDA) encoder/decoder block 122 may support serial infrared (SIR) mode of infrared communication.

The enhanced high speed serial (EHSS) port block 118 comprises at least one EHSS interface that is configured to handle serial data. As illustrated in FIG. 1C, the EHSS block 118 may comprise a first EHSS 118a and a second EHSS interface 118b. The EHSS 118a and 118b may provide time division multiplexing (TDM) interface for connecting the gigabit Ethernet IP telephone chip 100 with external CODECs or any external device with a synchronous interface.

The UPB bridge block 188 may comprise suitable circuitry, logic, and/or code and may be adapted to bridge the peripheral bus 114 and the system bus 116. Accordingly, the UPB bridge facilitates communication between devices coupled to the system bus 116 and peripheral devices coupled to the peripheral bus 114.

During an exemplary voice data transmission operating cycle, voice data may be acquired via the microphone ports 170f, 170g, 174f, and 174g of CODEC blocks 102a and 102b within the dual CODEC block 102. Voice data may be initially amplified by the on-board amplifiers 170a and 174a, and then digitized by the ADC blocks 170 and 174 at a high sampling rate, such as 12.5 MHz, for example. The oversampled voice data may be decimated by the CIC (Cascaded-Integrated-Comb) filters within the decimator/equalizer blocks 171 and 175, which may resample the data to an intermediate sampling rate of 100 kHz, for example.

A gain or attenuation may be applied to the resulting 100 kHz sampled signal. The gain-adjusted 100 kHz samples may be further downsampled by an asynchronous sample rate converter (ASRC), not shown in FIG. 1C, to a rate (voiceband) suitable for software digital signal processing, such as 16 kHz. The voiceband samples may be filtered by a programmable equalizer within the decimator/equalizer blocks 171 and 175, which may equalize the transducer response in order to meet telecom specifications. The voice data output of the decimator/equalizer blocks 171 and 175 may be stored in the external SDRAM 154 via the system bus 116 and a DMA control block within the dual CODEC block 102.

The stored voice data may then be communicated to the VPM block 108 for processing. For example, the equalized voice data may be processed by the DSP 180 using voice processing software stack. The software stack within the DSP 180 may perform VoIP processing, such as acoustic echo cancellation, handset echo cancellation, conference bridging, tone generation, comfort noise generation, and/or voice compression. In one embodiment of the invention, the gigabit Ethernet IP telephone chip 100 may utilize the core processor 104 to perform DSP processing functions. In this regard, equalized voice data may be communicated to the core processor 104 for DSP processing.

After equalized voice data is processed by the VPM 108, compressed speech frames may be packetized by the core processor 104. If security is required, packetized voice data may be communicated to the security module 106 for encryption. During encryption, voice data may be communicated from the VPM 108 to the security module 106 via the external SDRAM 154. After encryption, encrypted data packets may be further encapsulated by the core processor 104 with headers suitable for transmission over an IP network.

Encrypted packetized voice data may then be communicated to the multiport Ethernet switch 110 via direct memory access using the external SDRAM 154 and a DMA control block within the Ethernet switch 110. The multiport Ethernet switch 110 may then route the packetized voice data to a network port, such as port 1, for example. The packetized voice data may be converted into signals suitable for transmission over an Ethernet cable medium using the internal 10/100Base Ethernet PHY 112c or a gigabit Ethernet PHY, not illustrated in FIG. 1C, coupled to the RGMII interface 112d. A gigabit Ethernet PHY may be located, for example, off-chip. The 10/100Base PHY or the gigabit PHY may then transmit the packetized voice data via an Ethernet network.

During an exemplary voice data reception operating cycle, packetized voice data may be received by the multiport Ethernet switch 110 via an Ethernet cable medium using the internal 10/100Base Ethernet PHY 112c or a gigabit Ethernet PHY coupled to the RGMII interface 112d of port 1 of the multiport Ethernet switch 110. The multiport Ethernet switch 110 may then route the packetized voice data internally for processing within the gigabit Ethernet IP telephone chip 100 via port 2. For example, the packetized voice data may be stored in the external DDR SDRAM 154 via the system bus 116 and the DMA control block within the Ethernet switch 110.

The stored packetized voice data may then be communicated to the security module 106 for decryption. Decrypted packetized data may be depacketized by the core processor 104. Depacketized and decrypted voice data may be communicated to the VPM 108 for processing. The VPM 108 may decompress the voice data and may communicate the decompressed voice data to the dual CODEC block 102. The decompressed data may be filtered by the CIC filter 173 or 177 within the CODEC blocks 102a or 102b. Filtered voice data may be converted to an analog signal by the DAC converters 172 or 176, amplified by the amplifiers 170d, 170e, 174d, and 174e, and communicated to one or more of the audio signal outputs 170h, 170i, 174h; and 174i.

During an exemplary network data transmission operating cycle, network data, such as Ethernet data from a PC, may be received by the multiport Ethernet switch 110 via an Ethernet cable medium using the internal 10/100Base Ethernet PHY 112a or a gigabit Ethernet PHY coupled to the RGMII interface 112b of port 0 of the multiport Ethernet switch 110. In one embodiment of the invention, one of the ports of the multiport Ethernet switch 110, such as port 0, may be designated as a PC port and may be utilized during reception and transmission of PC Ethernet data. The 10/100Base Ethernet PHY 112a or the gigabit PHY may convert the PC Ethernet data from analog to digital format. The multiport Ethernet switch 110 may then route the resulting IP packets to a second port, such as port 1, for communicating the packetized PC Ethernet data off-chip. For example, the multiport Ethernet switch 110 may then route the resulting IP packets to the internal 10/100Base PHY 112c of port 1 or to an external gigabit PHY via the RGMII interface 112d. The 10/100Base PHY 112c or the gigabit PHY may convert the packetized PC Ethernet data into signals suitable for transmission over Ethernet cable medium. In this regard, the signal may flow through the Ethernet cable medium and into an IP network.

During an exemplary network data reception operating cycle, network data, such as Ethernet data for a PC, may be received by the multiport Ethernet switch 110 via an Ethernet cable medium using the internal 10/100Base Ethernet. PHY 112c or a gigabit Ethernet PHY coupled to the RGMII interface 112d of port 1 of the multiport Ethernet switch 110. In one embodiment of the invention, one of the ports of the multiport Ethernet switch 110, such as port 0, may be designated as a PC port and may be utilized during reception and transmission of PC Ethernet data. A second port, such as port 1, may be designated as a network port and may be utilized during reception and transmission of packetized data, including voice and network data, from and to an IP network. The 10/100Base Ethernet PHY 112d or the gigabit PHY may convert the network data from analog to digital format. The multiport Ethernet switch 110 may then route the resulting IP packets to a second PC data port, such as port 0, for communicating the packetized network data off-chip to a PC. For example, the multiport Ethernet switch 110 may route the resulting IP packets to the internal 10/100Base PHY 112a of port 0 or to an external gigabit PHY via the RGMII interface 112b. The 10/100Base PHY 112a or the gigabit PHY may convert the packetized PC Ethernet data into signals suitable for transmission over Ethernet cable medium. In this regard, the signal may flow through the Ethernet cable medium and off-chip to a PC for processing.

Figure 2:
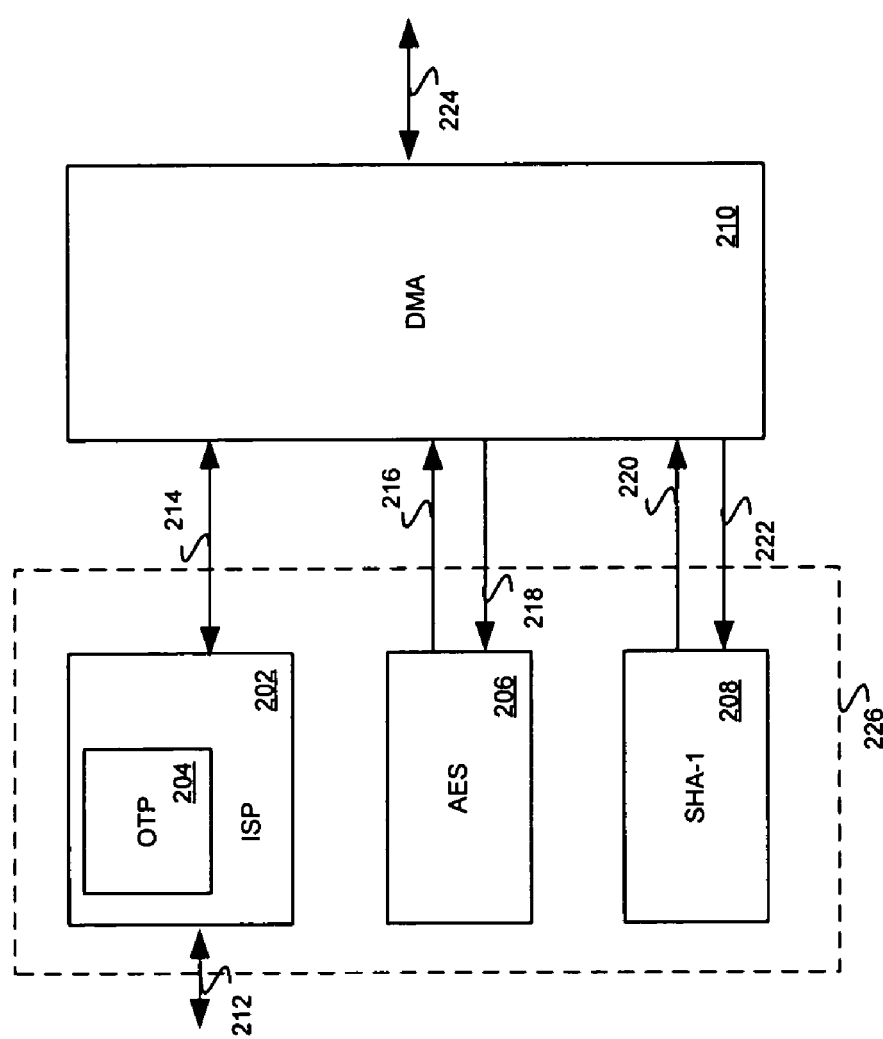
FIG. 2 is a block diagram of an on-chip security module (OSM) that may be integrated within a gigabit Ethernet IP telephone chip, in accordance with an embodiment of the invention.

FIG. 2 is a block diagram of an on-chip security module (OSM) that may be integrated within a gigabit Ethernet IP telephone chip, in accordance with an embodiment of the invention. Referring to FIG. 2, the OSM 226 may comprise an integrated security processor (ISP) 202, an advanced encryption standard (AES) encryption/decryption block 206, and a secure hash-algorithm (SHA-1) block 208. The ISP 202 may comprise suitable circuitry, logic, and/or code and may be adapted to provide secure key protection and management for one or more secure keys utilized by the OSM 226 for device authentication and/or data encryption or decryption. The ISP 202 may comprise a one-time programmable (OTP) memory 204, which may be utilized to store one or more unique security identifiers identifying the OSM 226.

The AES encryption/decryption block 206 may comprise suitable circuitry, logic, and/or code and may be utilized to encrypt and/or decrypt data, such as voice or network data, within the OSM 226. In this regard, the AES encryption/decryption block 206 may utilize one or more encryption/decryption algorithms, such as a public key cryptography algorithm. The SHA-1 block 208 may comprise suitable circuitry, logic, and/or code and may be utilized for authentication of one or more secure keys that may be utilized by the AES encryption/decryption block 206 during encryption and/or decryption of voice or network data. In one embodiment of the invention, the AES encryption/decryption block 206 and the SHA-1 block 208 may be integrated within the ISP 202.

The OSM 226 may be integrated within a gigabit Ethernet IP telephone chip, such as the gigabit Ethernet IP telephone chip 100 in FIG. 1C, and the gigabit Ethernet IP telephone chip may be integrated within a gigabit Ethernet IP telephone 192a in FIG. 1B. In operation, the ISP 202 may receive a control signal 212 which may cause the ISP 202 to establish a secure link with a key management module (illustrated in FIG. 3) via connection 214 and the DMA block 210. The key management module may be implemented within the gigabit Ethernet IP telephone, for example, and may utilize one or more unique security identifiers stored in the OTP memory 204 to authenticate the OSM 226. In one embodiment of the invention, the key management module may be implemented as a secure server outside the gigabit Ethernet IP telephone and a secure network link may be established between the gigabit Ethernet IP telephone with gigabit Ethernet IP telephone chip with integrated OSM.

After the OSM 226 is authenticated, the key management module may communicate one or more application keys to the OSM 226 via the DMA block 210. The SHA-1 block 208 may be utilized for authentication of the application keys received from the key management module. Results of the application key authentication may be read from external memory or stored in external memory via the DMA block 210 and connections 220 and 222. In one aspect of the invention, the DMA block 210 may be implemented within the OSM 226.

The application keys may then be decrypted by the secure module 226 and may be utilized by the AES encryption/decryption block 206 during encryption and/or decryption of data. Voice and/or network data may be communicated to and from the OSM 226 via a direct memory access (DMA) block 210. For example, encrypted data may be stored in on-chip or external memory and may be accessed by the DMA block 210 via the connection 224. Encrypted data may be fetched by the DMA block 210 and may be communicated to the AES encryption/decryption block 206 for decryption via connection 218. Decrypted voice and/or network data may be communicated to the DMA block 210 via the connection 216.

Figure 3:
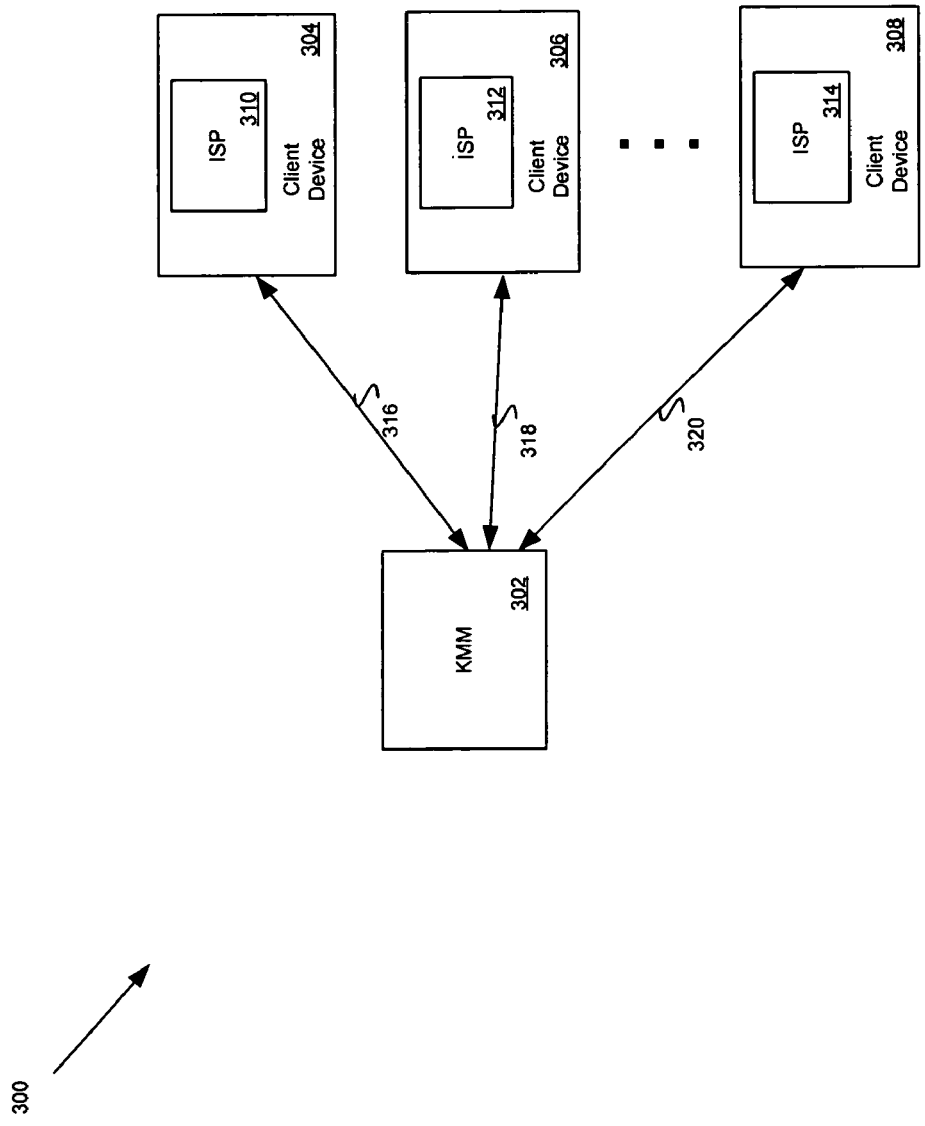
FIG. 3 is a block diagram of a key management system utilizing a key management module, in accordance with an embodiment of the invention.

FIG. 3 is a block diagram of a key management system utilizing a key management module, in accordance with an embodiment of the invention. Referring to FIG. 3, the key management system 300 may comprise a key management module 302 and a plurality of client devices 304, ..., 308. The key management module 302 may comprise suitable circuitry, logic, and/or code and may be adapted to perform security key functions related to encryption and decryption of voice and/or network data within one or more of the client devices 304, ..., 308 linked to the key management module 302 via connections 316, ..., 320, respectively. Security key functions of the key management module 302 may comprise secure key management for cryptographic keys generation, authentication and exchange, setting capabilities and security limits of security keys, implementing security key backup and recovery, security key storage, and security key revocation and destruction, for example.

The client devices 304, ..., 308 may be, for example, gigabit Ethernet IP telephones utilizing gigabit Ethernet IP telephone chips (not illustrated in FIG. 3). The client devices 304, ..., 308 may also utilize integrated security processors (ISPs) 310, ..., 314, respectively. The ISPs 310, ..., 314 may comprise suitable circuitry, logic, and/or code and may be adapted to provide secure key protection and management for one or more secure keys utilized by ISP 310, ..., 314 integrated within the client devices 304, ..., 308, respectively, for client device authentication and/or voice or network data encryption and decryption.

In one embodiment of the invention, each of the connections 316, ..., 320 may comprise an encrypted communication channel between the client devices 304, ..., 308 and the key management module 302. In this regard, the encrypted communication channels 316, ..., 320 may be utilized for secure communication of security key data between the key management module 302 and the client devices 304, ..., 308.

Figure 4:
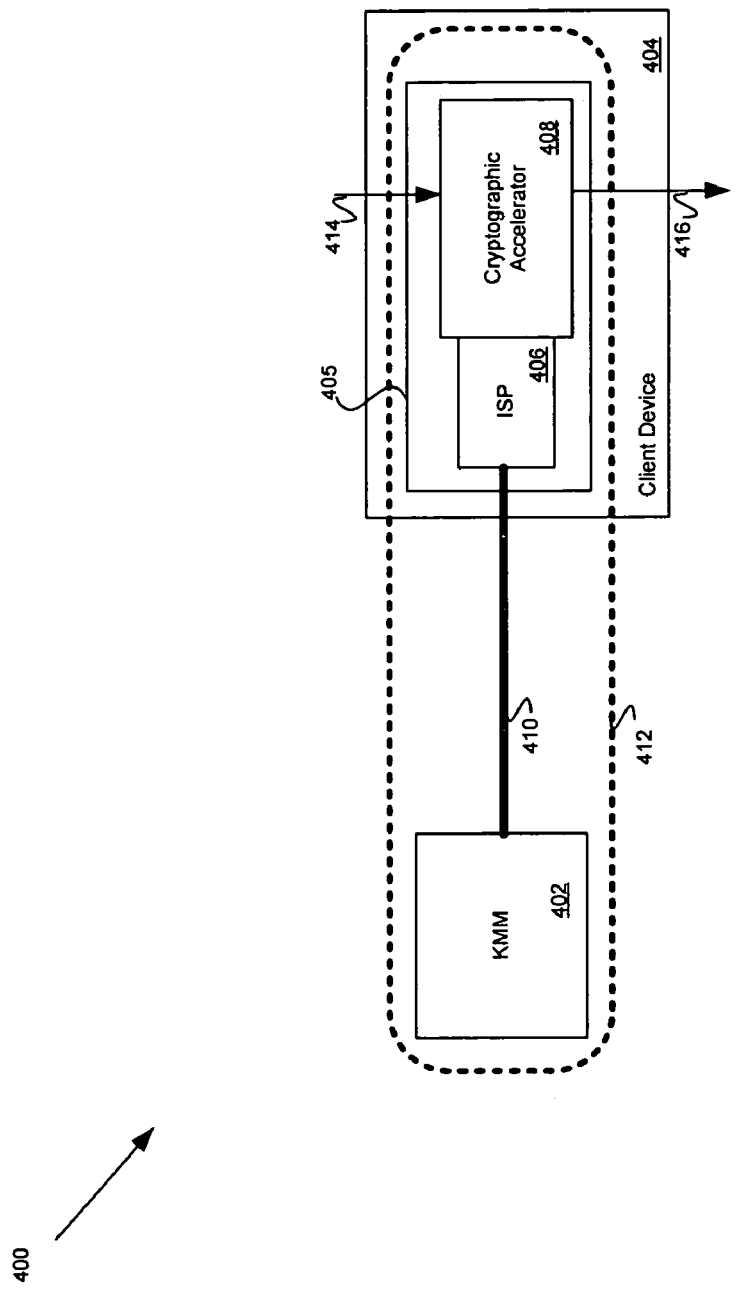
FIG. 4 is a block diagram of a secure key verification and exchange system, in accordance with an embodiment of the invention.

FIG. 4 is a block diagram of a secure key verification and exchange system, in accordance with an embodiment of the invention. Referring to FIG. 4, the secure key verification and exchange system 400 may comprise a key management module 402 and a client device 404. The client device 404 may comprise an OSM 405. In one embodiment of the invention, the client device 404 may be a gigabit Ethernet IP telephone comprising a gigabit Ethernet IP telephone chip integrated therein. The gigabit Ethernet IP telephone chip may comprise an integrated OSM 405.

The OSM 405 may comprise suitable circuitry, logic, and/or code and may be adapted to handle security functions, such as encryption, decryption and/or authentication during processing of voice and/or network data by the client device 404. The OSM 405 may comprise a integrated security processor 406 and a cryptographic accelerator block 408. The ISP 406 may comprise suitable circuitry, logic, and/or code and may be adapted to provide secure key protection and management for one or more secure keys utilized by the OSM 405 for device authentication and/or data encryption or decryption within the client device 404. The cryptographic accelerator block 408 may comprise suitable circuitry, logic, and/or code and may be utilized to encrypt and/or decrypt data, such as voice or network data. In this regard, the cryptographic accelerator block 408 may utilize one or more encryption/decryption algorithms, such as a public key cryptography algorithm. The cryptographic accelerator block 408 may also comprise suitable circuitry, logic, and/or code for authentication of one or more secure keys that may be utilized during encryption and/or decryption of voice or network data within the client device 404. In one embodiment of the invention, the cryptographic accelerator block 408 may be integrated within the ISP 406.

The key management module (KMM) 402 may comprise suitable circuitry, logic, and/or code and may be adapted to perform security key functions related to encryption and decryption of voice and/or network data within one or more of the client devices 404 linked to the KMM 402 via connection 410. Security key functions of the KMM 402 may comprise secure key management for cryptographic keys generation, authentication and exchange, setting capabilities and security limits of security keys, implementing security key backup and recovery, security key storage, and security key revocation and destruction, for example.

The KMM 402 may communicate with the ISP 406 via an encrypted communication channel 410. The encrypted communication channel 410 may be utilized for secure key transfer over an insecure communication medium, such as network and/or Internet, between the ISP 406 and the KMM 402.

In operation, the KMM 402 may establish a connection with the ISP 406 via the security communication channel 410. The ISP 406 may provide one or more unique security identifiers internal to the OSM 405 and the client device 404, to the KMM 402. The KMM 402 may utilize the unique security identifiers to authenticate the client device 404. The KMM 402 may then communicate one or more encrypted security keys to the ISP 406 via the encrypted communication channel 410. The security keys received from the KMM 402 may be decrypted by the cryptographic accelerator block 408. The decrypted security keys, such as one or more application keys, may be utilized within the client device 404 during encryption and/or decryption of input voice or network data 414.

In one embodiment of the invention, security key information may be communicated between the KMM 402 and the client device 404 so that the secure key information may remain within the secure boundary 412, resulting in increased security of data processing within the client device 404. In this regard, the integrity of the security keys may be preserved and hacker violation attempts may be avoided by communicating the security keys only between the KMM 402, the ISP 406 and the cryptographic accelerator block 408.

Figure 5:
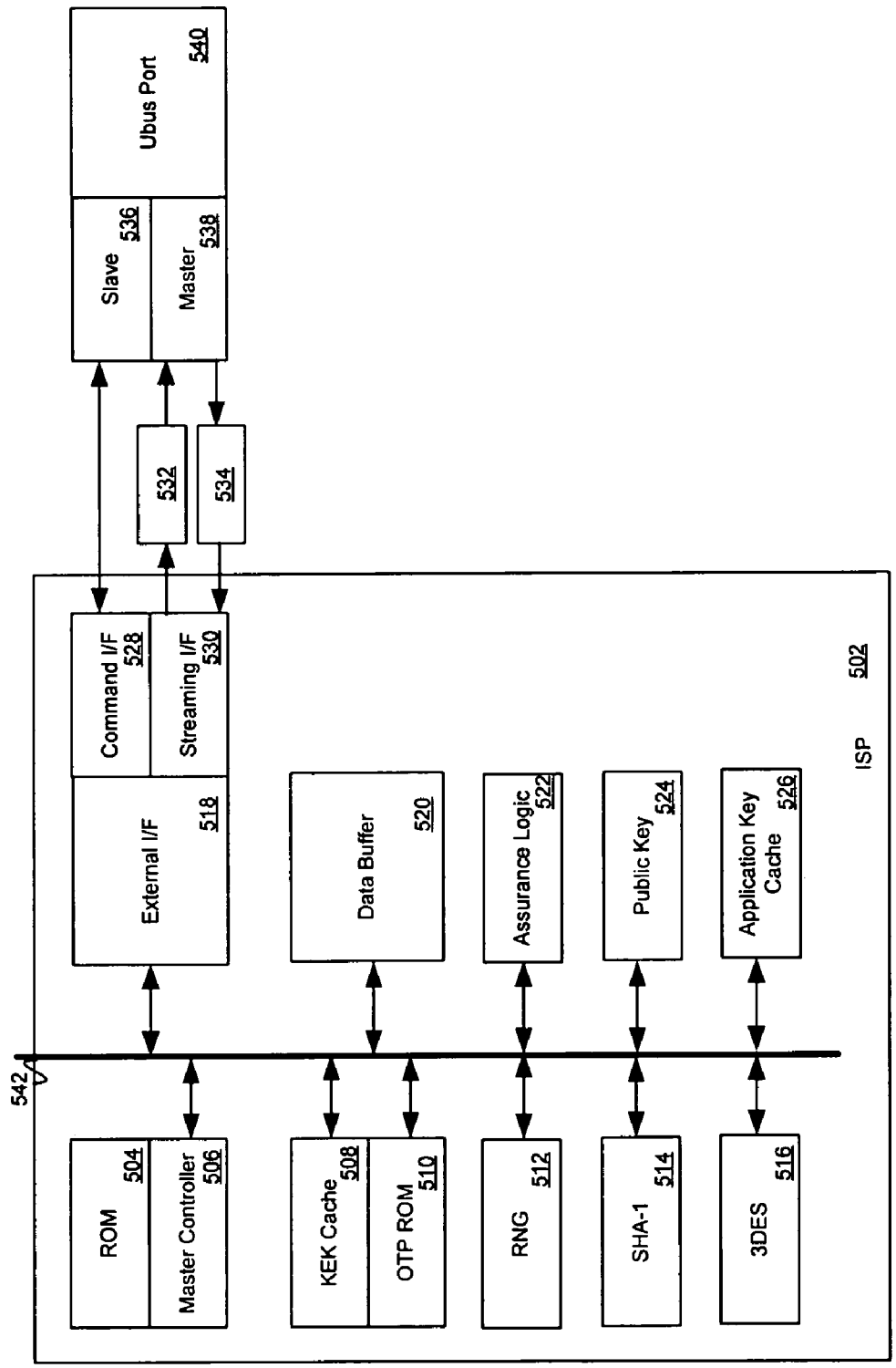
FIG. 5 is a block diagram of an integrated security processor, in accordance with an embodiment of the invention.

FIG. 5 is a block diagram of an integrated security processor, in accordance with an embodiment of the invention. Referring to FIG. 5, the ISP 502 may comprise a read only memory (ROM) 504, a master controller 506, a key encryption key (KEK) cache 508, a one-time programmable (OTP) ROM 510, a random number generator (RNG) 512, a secure hash algorithm (SHA-1) block 514, an encryption/decryption block 516, an external command interface 518, a command interface 528, a streaming interface 530, data buffer 520, assurance logic 522, a public key acceleration block 524, and an application key cache 526, which may all be coupled via the bus 542.

The master controller 506 may comprise suitable circuitry, logic, and/or code and may be adapted to sequence events within the ISP 502, such as transfer of data into the data buffer 520. The master controller may comprise a RISC processor with ROM 504 and may be utilized to execute various security key and data processing commands. The RISC engine within the master controller 506 may utilize a protected portion of the data buffer 520 as a temporary stack and scratch data space. In this regard, the protected data region within the data buffer 520 may be fixed based on ROM code requirements for the ISP 502.

The master controller 506 may also comprise a global register block (not illustrated in FIG. 5). The global register block may comprise a global register and a time tick register, which may be accessible by an external host processor. The global register block may be used by the host processor to send a command for processing by the ISP 502. The time tick register may be read by the local host processor, for example. The time tick register values increments from a particular start time at reset and the time tick register values may be used to enforce expiration of time based keys. The key expiration times may be enforced as relative time ticks based on the time tick register.

The external interface 518 may comprise suitable circuitry, logic, and/or code and may be used by a host processor to read global registers, issue commands and place voice data, network data or security key information into the data buffer 520 for processing within the ISP 502. The external command interface is an address mapped interface and may be controlled via the global registers block within the master controller 506. The external interface 518 may comprise a command interface 528 and a streaming interface 530. The command interface 528 may be utilized to receive processing commands from a host processor, for example. The streaming interface may be utilized to acquire data for processing within the ISP 502 via the input buffer 534, and to output processed data via the output buffer 532.

The data buffer 520 may comprise a single port memory, which may be accessible to the master controller 506. In one embodiment of the invention, the data buffer 520 may be 4 Kbytes and may be split internally into a plurality of sections. Exemplary section may comprise an input/output (I/O) section, a scratch section for the master controller 506, and a long term memory section, which may be maintained between executions of processing commands.

The public key acceleration block 524 may comprise suitable circuitry, logic, and/or code and may provide acceleration of encryption/decryption operations performed by the encryption/decryption block 516 and/or authentication operations performed by the secure hash algorithm block 514. For example, the public key acceleration block 524 may accelerate Diffie-Hellman public key exchange between the ISP 502 and a key management module, as well as digital signature authentication (DSA) operation.

The random number generator (RNG) 512 may comprise suitable circuitry, logic, and/or code and may be adapted to generate pseudo-random numbers as initial secret key values. The value from the random number generator may be post-processed using the SHA-1 block 514 by the master controller 506 before internal usage and before exposing any secret key values outside the ISP 502.

The secure hash algorithm (SHA-1) block 514 may comprise suitable circuitry, logic, and/or code and may provide a SHA-1 algorithm implementation. In this regard, the SHA-1 block 514 may be utilized to authenticate one or more security keys for use within the ISP 502. The encryption/decryption block 516 may comprise suitable circuitry, logic, and/or code and may be adapted to encrypt or decrypt voice or network data communicated for processing within the ISP 502. In this regard, the encryption/decryption block 516 may utilize encoding or decoding security keys, which may be transferred from the application key cache 526 or the KEK cache 508, for example.

The key encryption key (KEK) cache 508 may comprise suitable circuitry, logic, and/or code and may be utilized to store one or more short term key encryption keys, which may be utilized during authentication of the ISP 502 and a KMM via an encryption channel, as well as during generation of an application key used for encryption and decryption of data within the ISP 502. For example, one or more intermediate security keys, such as a session private key and a single asymmetric group key, may be stored by the KEK cache 508 and utilized for generation of an application key.

The OTP memory 510 may be utilized for storage of long term security keys in the ISP 502. In one embodiment of the invention, the OTP memory 508 may comprise an OTP ROM and may be utilized to store one or more unique security identifiers, which may identify the ISP 502 and a client device implementing the ISP 502. The OTP ROM 510 may also story security keys, which may be used in decrypting one or more keys received from a key management module, for example. The application key cache 526 may comprise suitable circuitry, logic, and/or code and may be utilized to perform security key lifetime expiration of security keys used by the ISP 502.

The assurance logic block 522 may comprise suitable circuitry, logic, and/or code and may be utilized to protect against system security attacks. For example, the assurance logic block 522 may comprise one or more circuits, which may trigger a reset if a security violation is detected while data is being encoded or decoded within the ISP 502. If the assurance logic block 522 triggers a reset, the reset may delete transient state information in the ISP 502, including clearing key cache locations. An interrupt may then be provided to the local host with information on which protection mechanism triggered the reset.

In operation, processing instructions from a processing core and data may be communicated to the ISP 502 for processing via the universal bus port 540. The universal bus port 540 may comprise a slave port 536 and a master port 538. The master port may be utilized to communicate security key information and data, such as voice or network data, to the streaming interface 530 via the input buffer 534. Processed data, such as decoded voice or network data may be communicated outside the ISP 502 via the output buffer 532. The slave port 536 may be utilized for communication of one or more host processor instructions to the command interface 528.

Voice or network data received by the ISP 502 may be stored in the data buffer 520. After data is stored in the data buffer 520, the master controller 506 may initiate a key authentication and generation sequence. During a key authentication and generation sequence, the ISP 502 may be connected via an encrypted channel to a key management module (not illustrated in FIG. 5). The ISP 502 may then communicate one or more unique security identifiers to the key management module. The key management module may use the unique security identifiers to authenticate the ISP 502. After, the ISP 502 is authenticated, the key management module and the ISP 502 may exchange and mutually authenticate one or more intermediate security keys, such as public and private shared secret keys. Intermediate security keys may be stored in the KEK cache 508 and may be decrypted by the ISP 502 utilizing the public key acceleration block 524, the encryption/decryption block 516, and/or the secure hash algorithm (SHA-1) authentication block 514. The intermediate security keys may then be utilized by the ISP 502 to decrypt an application key communicated from the key management module. The application key may be utilized within the ISP 502 for encryption or decryption of data stored in the data buffer 520, such as voice or network data.

In one embodiment of the invention, the decrypted application key may be utilized by the ISP 502 to generate one or more session keys. The session keys may be utilized within the ISP 502 for encryption or decryption of data stored in the data buffer 520, such as voice or network data. Furthermore, the session keys may be periodically expired and replaced with new session keys generated from the application keys. In this regard, the application key cache 526 may be utilized to delete expired session keys.

Figure 6:
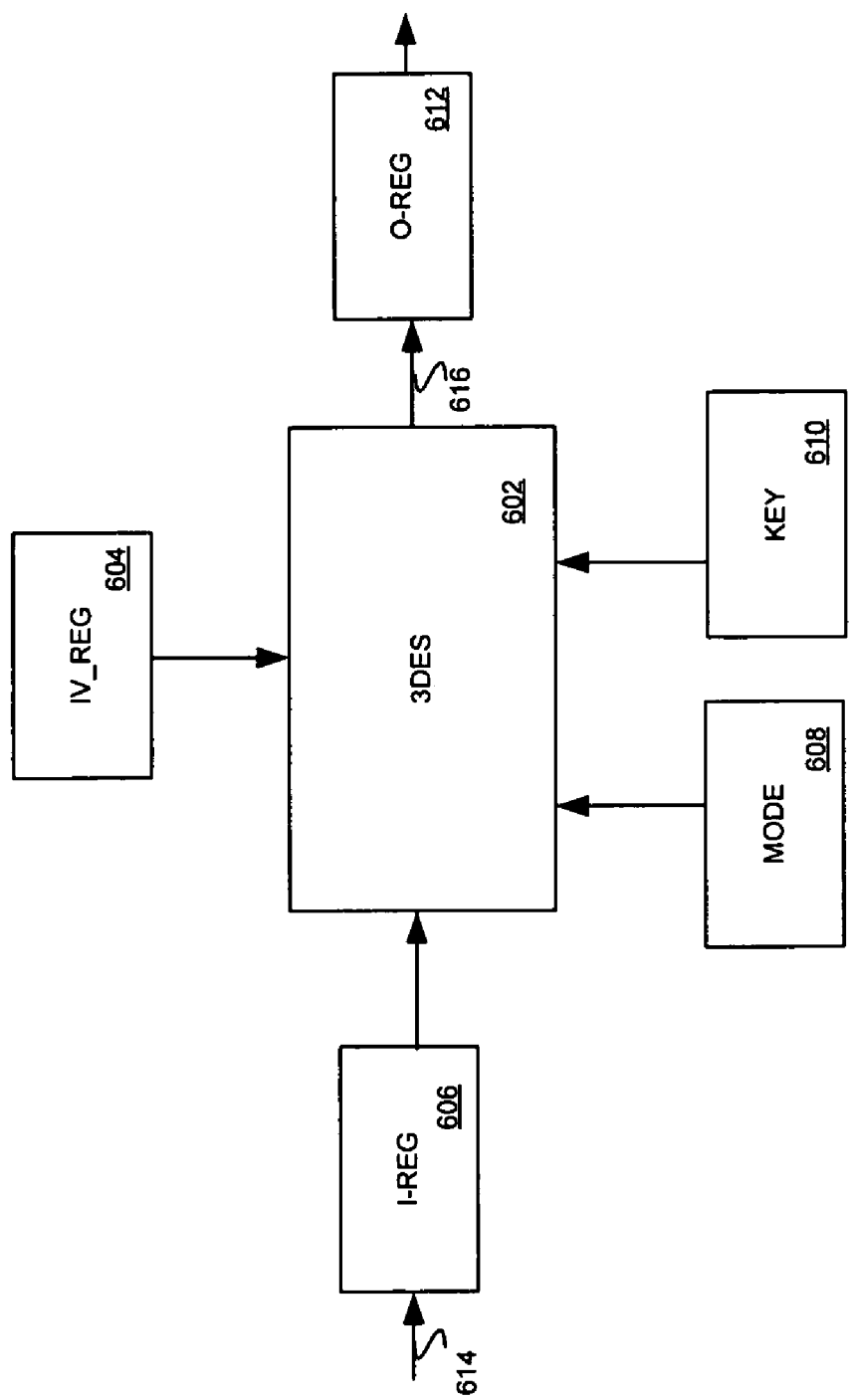
FIG. 6 is a block diagram of a 3DES encryption engine, in accordance with an embodiment of the invention.

FIG. 6 is a block diagram of a 3DES encryption engine, in accordance with an embodiment of the invention. Referring to FIG. 6, the three-stage data encryption standard (3DES) engine may comprise a 3DES block 602, an input register 606, an output register 612, an initial vector register 604, a mode register 608 and a key register 610. The 3DES block 602 may comprise suitable circuitry, logic, and/or code and may be utilized during encryption and/or decryption of data. The 3DES block 602 may be implemented within an encryption/decryption block, such as the encryption/decryption block 516, illustrated in FIG. 5.

In an exemplary data encryption/decryption cycle, input data 614 may be communicated and stored by the input register 606. The initial vector register 604 may comprise suitable circuitry, logic, and/or code and may be adapted to store an initial vector value which may be utilized by the 3DES block 602 during encryption/decryption. The initial vector value may be obtained from the input data 614. The mode register 608 may comprise suitable circuitry, logic, and/or code and may be adapted to store one or more encryption/decryption modes, which may be utilized by the 3DES block 602 during an encryption/decryption operation cycle. For example, the encryption/decryption modes may comprise an electronic code book (ECB) mode, a cyclic block chaining (CBC) mode, a cipher feedback (CFB) mode, and/or an output feedback (OFB) mode.

The key register 610 may comprise suitable circuitry, logic, and/or code and may store one or more security keys for data encryption or decryption. The security keys may comprise, for example, an application key or a session key. The key values stored in the key register 610 may be transferred from an application key cache, a key encryption key (KEK) cache, or may be the result of a shared secret derivation between an ISP incorporating the 3DES block 602 and a key management module. After the security key and the initial vector are stored in the key register 610 and the initial vector register 604, the 3DES block 602 may encrypt/decrypt the input data 614 stored in the input register 606. The encryption/decryption process may utilize an encryption/decryption mode stored in the mode register 608. The processed data 616 may be stored in an output register 612. In one embodiment of the invention, the 3DES block 602 may protect encryption/decryption data operation by blocking any changes to the security key during an encryption or decryption operation cycle.

Figure 7:
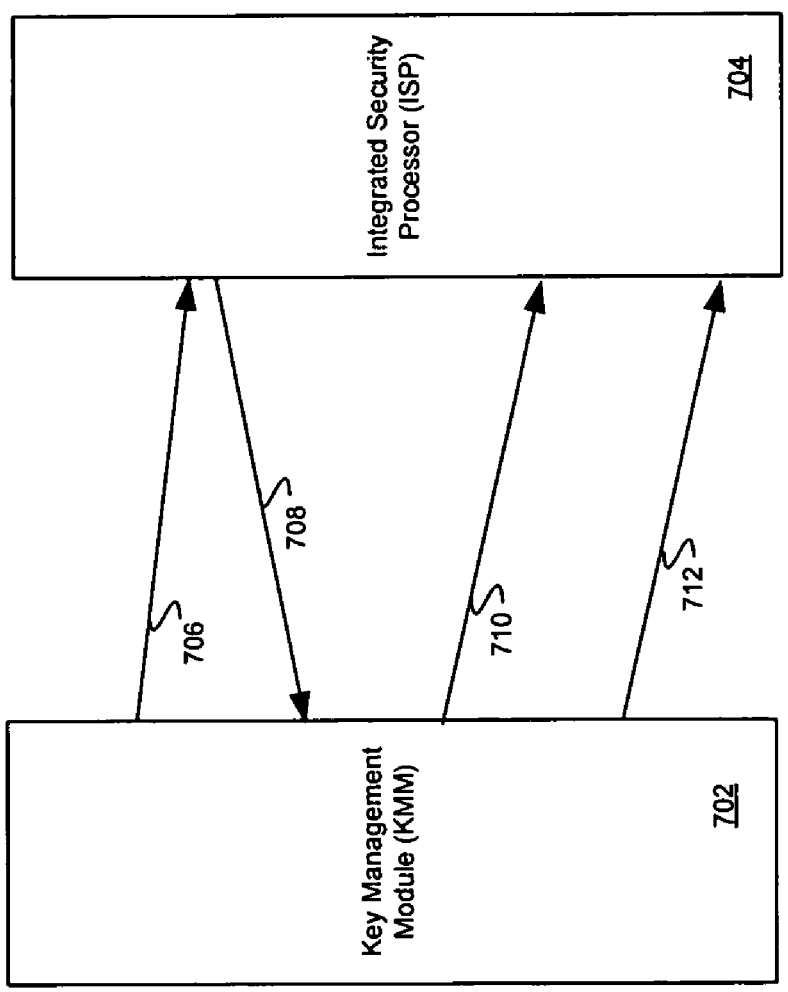
FIG. 7 is a block diagram illustrating an exemplary secure key exchange protocol between a key management module and an integrated security processor, in accordance with an embodiment of the invention.

FIG. 7 is a block diagram illustrating an exemplary secure key exchange protocol between a key management module and an integrated security processor, in accordance with an embodiment of the invention. Referring to FIG. 7, the key management module (KMM) 702 may comprise suitable circuitry, logic, and/or code and may be adapted to perform security key functions related to encryption and decryption of voice and/or network data within the ISP 704. Security key functions of the KMM 702 may comprise secure key management for cryptographic keys generation, authentication and exchange, setting capabilities and security limits of security keys, implementing security key backup and recovery, security key storage, and security key revocation and destruction, for example. The KMM 702 and the ISP 704 may be connected via an encrypted channel (not illustrated in FIG. 7).

In an exemplary encryption/decryption operation cycle, the ISP 704 and the KMM 702 may establish a secure connection and exchange one or more security keys, for example, which may be utilized by the ISP 704 to decrypt an application key. The application key may be utilized by the ISP 704 for encryption or decryption of voice or network data.

Initially, after the ISP 704 is connected with the KMM 702 via an encrypted channel, the ISP may receive a "challenge" signal 706 from the KMM 702. In response to the "challenge" signal 706, the ISP 704 may communicate one or more unique security identifiers 708 to the key management module 702. The KMM 702 may use the unique security identifiers 708 to authenticate the ISP 704. After the ISP 704 is authenticated, the KMM 702 and the ISP 704 may exchange and mutually authenticate one or more intermediate security keys 710 and 712, such as public and private shared secret keys, for example. Intermediate security keys 710 and 712 may be stored in a key encryption key (KEK) cache within the ISP 704. The intermediate keys 710 and 712 may be decrypted by the ISP 704 utilizing a public key acceleration block, an encryption/decryption block, and/or a secure hash algorithm (SHA-1) authentication block (not illustrated in FIG. 7). The intermediate security keys 710 and 712 may then be utilized by the ISP 704 to decrypt an application key communicated from the key management module 702. The application key may be utilized within the ISP 704 for encryption or decryption of data, such as voice or network data.

Figure 8:
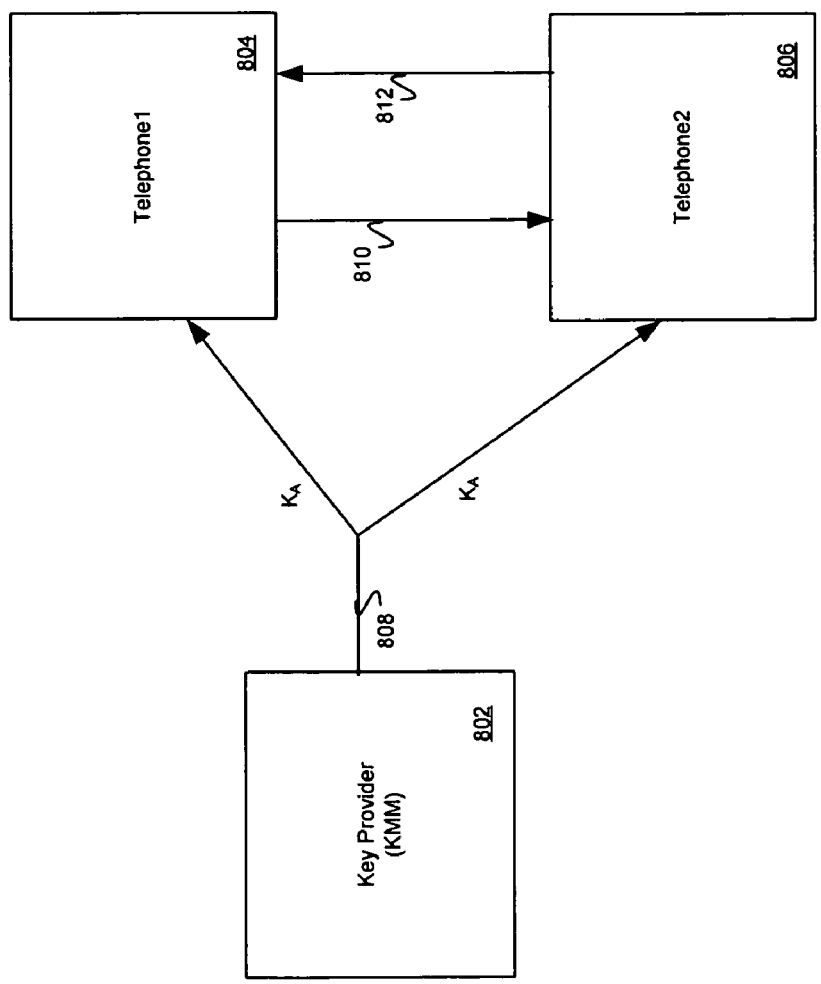
FIG. 8 is a block diagram of a secure key verification and exchange system utilizing a single application key, in accordance with an embodiment of the invention.

FIG. 8 is a block diagram of a secure key verification and exchange system utilizing a single application key, in accordance with an embodiment of the invention. Referring to FIG. 8, the secure key verification and exchange system may comprise a key management module (KMM) 802, a first telephone 804 and a second telephone 806. The KMM 802 may comprise suitable circuitry, logic, and/or code and may be adapted to perform security key functions related to encryption and decryption of voice and/or network data within integrated security processors (ISPs) integrated within the first and second telephones 804 and 806. Security key functions of the KMM 802 may comprise secure key management for cryptographic keys generation, authentication and exchange of keys with the telephones 804 and 806, setting capabilities and security limits of security keys for the telephone 804 and 806, implementing security key backup and recovery, security key storage, and security key revocation and destruction for security keys used by the telephones 804 and 806, for example. The KMM 802 and the telephones 804 and 806 may be connected via encrypted channels.

In one embodiment of the invention, the KMM 802 and the first and second telephones 804 and 806 may utilize a symmetric scheme for application key use. For example, after a secure key exchange protocol, such as the secure key protocol described with regard to FIG. 7, a single application key 808 may be established for use by both telephone 804 and 806. The single application key 808 may be communicated to both telephones 804 and 806 for use during encryption and decryption of voice data communicated between the two telephones 804 and 806. For example, voice data 810 communicated from the first telephone 804 to the second telephone 806 may be encrypted by the first telephone 804 and decrypted by the second telephone 806 using the same single application key 808. Similarly, voice data 812 communicated from the second telephone 806 to the first telephone 804 may be encrypted by the second telephone 806 and decrypted by the first telephone 804 using the same single application key 808.

Even though use of an application key is described with regards to FIG. 8, the present invention may not be so limited. Therefore, the first and second telephones 804 and 806 may utilize the single application key 808 to derive one or more session keys, using a derivation function. The same session key, or keys, may then be utilized for encryption and decryption of voice data communicated between the telephones 804 and 806.

Figure 9:
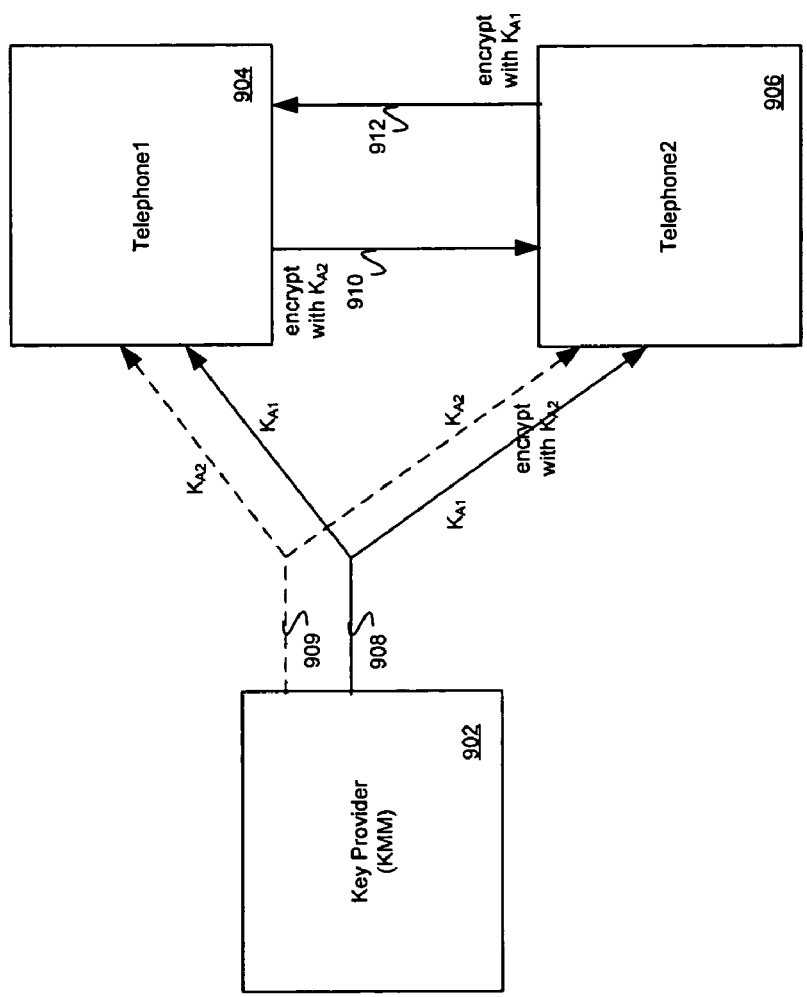
FIG. 9 is a block diagram of a secure key verification and exchange system utilizing a plurality of application keys, in accordance with an embodiment of the invention.

FIG. 9 is a block diagram of a secure key verification and exchange system utilizing a plurality of application keys, in accordance with an embodiment of the invention. Referring to FIG. 9, the secure key verification and exchange system may comprise a key management module (KMM) 902, a first telephone 904 and a second telephone 906. The KMM 902 may comprise suitable circuitry, logic, and/or code and may be adapted to perform security key functions related to encryption and decryption of voice and/or network data within integrated security processors (ISPs) integrated within the first and second telephones 904 and 906. Security key functions of the KMM 902 may comprise secure key management for cryptographic keys generation, authentication and exchange of keys with the telephones 904 and 906, setting capabilities and security limits of security keys for the telephone 904 and 906, implementing security key backup and recovery, security key storage, and security key revocation and destruction for security keys used by the telephones 904 and 906, for example. The KMM 902 and the telephones 904 and 906 may be connected via encrypted channels.

In one embodiment of the invention, the KMM 902 and the first and second telephones 904 and 906 may utilize an asymmetric scheme for application key use. For example, after a secure key exchange protocol, such as the secure key protocol described with regard to FIG. 7, a plurality of application keys, such as a first application key 908 and a second application key 909 may be established for use by both telephones 904 and 906. The first application key 908 may be utilized to encrypt or decrypt voice data within the first telephone 904. Similarly, the second application key 909 may be utilized to encrypt or decrypt voice data within the second telephone 906. The first and second application keys 908 and 909 may be communicated to both telephones 904 and 906 for use during encryption and decryption of voice data communicated between the two telephones 904 and 906. For example, voice data 910 communicated from the first telephone 904 to the second telephone 906 may be encrypted by the first telephone 904 utilizing the second application key 909 and decrypted by the second telephone 906 using again the second application key 909. Similarly, voice data 912 communicated from the second telephone 906 to the first telephone 904 may be encrypted by the second telephone 906 utilizing the first application key 908 and decrypted by the first telephone 904 using again the first application key 908.

Figure 10:
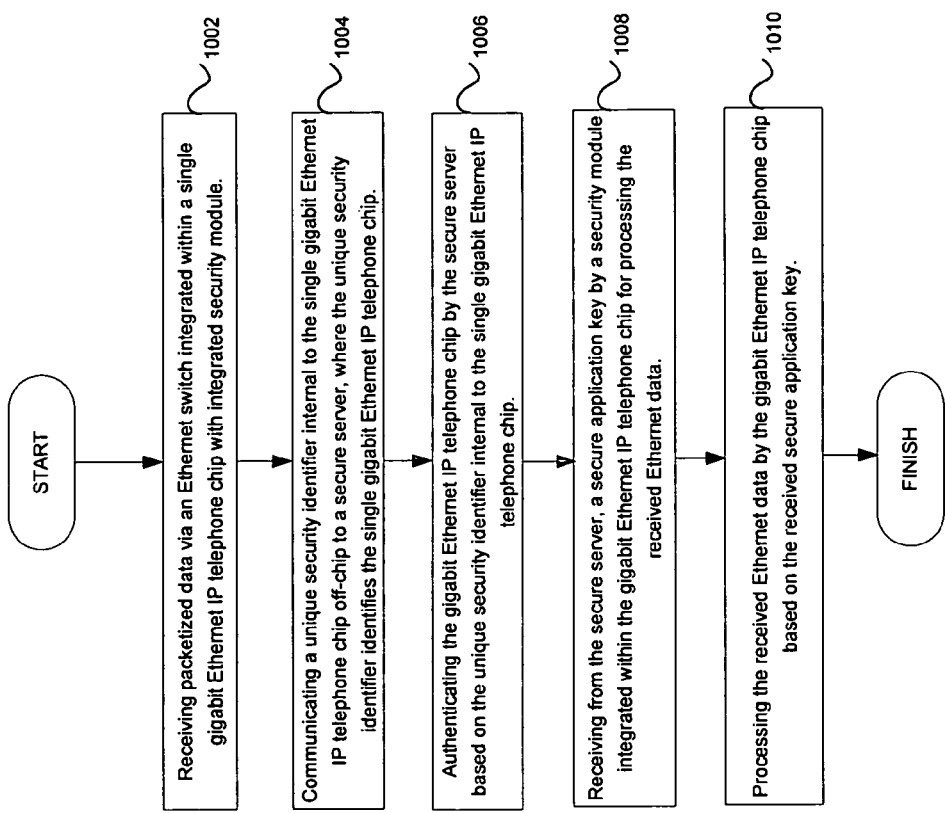
FIG. 10 is a flow diagram illustrating exemplary steps for processing Ethernet data, in accordance with an embodiment of the invention.

FIG. 10 is a flow diagram illustrating exemplary steps for processing Ethernet data, in accordance with an embodiment of the invention. Referring to FIG. 10, at 1002, packetized data, such as network or voice data may be received via an Ethernet switch integrated within a gigabit Ethernet IP telephone chip with integrated OSM. At 1004, a unique security identifier internal to the gigabit Ethernet IP telephone chip may be communicated off-chip to a secure server. The unique security identifier may then be utilized to identify the single gigabit Ethernet IP telephone chip with integrated OSM. At 1006, the gigabit Ethernet IP telephone chip may be authenticated by the secure server based on the unique security identifier internal to the single gigabit Ethernet IP telephone chip. At 1008, a secure application key may be received from the secure server by an OSM integrated within the gigabit Ethernet IP telephone chip for processing the received Ethernet data. At 1010, the received Ethernet data may be processed by the single gigabit Ethernet IP telephone chip based on the received secure application key.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embodied in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing Ethernet data, the method comprising:
    receiving Ethernet data via a single gigabit Ethernet IP telephone chip;
    receiving from a secure server, at least one secure application key by an on-chip security module (OSM) integrated within said gigabit Ethernet IP telephone chip for processing said received Ethernet data, wherein said at least one secure application key is only communicated from said secure server to said gigabit Ethernet IP telephone chip; and
    processing said received Ethernet data by said gigabit Ethernet IP telephone chip based on said received at least one secure application key.

2. The method according to claim 1, comprising communicating at least one unique security identifier internal to said single gigabit Ethernet IP telephone chip off-chip to said secure server, wherein said at least one unique security identifier identifies said single gigabit Ethernet IP telephone chip.

3. The method according to claim 2, wherein said secure server authenticates said gigabit Ethernet IP telephone chip based on said at least one unique security identifier internal to said single gigabit Ethernet IP telephone chip, prior to said receiving of said at least one secure application key.

4. The method according to claim 3, wherein said at least one unique security identifier is stored on-chip in said single gigabit Ethernet IP telephone chip.

5. The method according to claim 1, wherein said at least one secure application key comprises an encrypted application key.

6. The method according to claim 1, wherein said at least one secure application key is received via a secure link established between said single gigabit Ethernet IP telephone chip and said secure server.

7. The method according to claim 1, wherein said received at least one secure application key is authenticated via said secure server.

8. The method according to claim 1, comprising decrypting said received at least one secure application key by said OSM integrated within said gigabit Ethernet IP telephone chip.

9. The method according to claim 8, comprising decrypting at least a first portion of said received Ethernet data utilizing said decrypted at least one secure application key by said OSM integrated within said gigabit Ethernet IP telephone chip.

10. The method according to claim 1, comprising encrypting at least a second portion of said received Ethernet data utilizing at least a portion of said received at least one secure application key by said OSM integrated within said gigabit Ethernet IP telephone chip.

11. The method according to claim 1, wherein said received Ethernet data comprises one or both of network data and/or voice data.

12. A system for processing Ethernet data, the system comprising:
    a single gigabit Ethernet IP telephone chip that receives Ethernet data;
    an on-chip security module (OSM) integrated within said gigabit Ethernet IP telephone chip for processing said received Ethernet data, wherein said OSM receives from a secure server, at least one secure application key, wherein said at least one secure application key is only communicated from said secure server to said gigabit Ethernet IP telephone chip; and
    said gigabit Ethernet IP telephone chip processes said received Ethernet data based on said received at least one secure application key.

13. The system according to claim 12, wherein:
    said OSM communicates at least one unique security identifier internal to said single gigabit Ethernet IP telephone chip off-chip to said secure server, and said at least one unique security identifier identifies said single gigabit Ethernet IP telephone chip.

14. The system according to claim 13, wherein said secure server authenticates said gigabit Ethernet IP telephone chip based on said at least one unique security identifier internal to said single gigabit Ethernet IP telephone chip, prior to said receiving of said at least one secure application key.

15. The system according to claim 14, wherein said at least one unique security identifier is stored on-chip in said single gigabit Ethernet IP telephone chip.

16. The system according to claim 12, wherein said at least one secure application key comprises an encrypted application key.

17. The system according to claim 12, wherein said at least one secure application key is received via a secure link established between said single gigabit Ethernet IP telephone chip and said secure server.

18. The system according to claim 12, wherein said received at least one secure application key is authenticated via said secure server.

19. The system according to claim 12, wherein said OSM integrated within said gigabit Ethernet IP telephone chip decrypts said received at least one secure application key.

20. The system according to claim 19, wherein said OSM integrated within said gigabit Ethernet IP telephone chip decrypts at least a first portion of said received Ethernet data utilizing said decrypted at least one secure application key.

21. The system according to claim 12, wherein said OSM integrated within said gigabit Ethernet IP telephone chip encrypts at least a second portion of said received Ethernet data utilizing at least a portion of said received at least one secure application key.

22. The system according to claim 12, wherein said received Ethernet data comprises one or both of network data and/or voice data.

* * * * *

UNITED STATES PATENT AND TRADEMARK OFFICE
CERTIFICATE OF CORRECTION

| | | |
|---|---|---|
| PATENT NO. | : 7,746,846 B2 | Page 1 of 1 |
| APPLICATION NO. | : 11/151614 | |
| DATED | : June 29, 2010 | |
| INVENTOR(S) | : Boora et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C 154(b) by 1385 days.

Signed and Sealed this
Eighteenth Day of January, 2011

David J. Kappos
*Director of the United States Patent and Trademark Office*